US010572924B2

(12) United States Patent
Gungor et al.

(10) Patent No.: US 10,572,924 B2
(45) Date of Patent: Feb. 25, 2020

(54) AUTOMATIC GENERATION OF FEATURED FILTERS

(71) Applicant: WAL-MART STORES, INC., Bentonville, AR (US)

(72) Inventors: Onur Gungor, Sunnyvale, CA (US); Manas Pathak, Sunnyvale, CA (US); Ajay Gopalkrishna, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 375 days.

(21) Appl. No.: 15/421,240

(22) Filed: Jan. 31, 2017

(65) Prior Publication Data
US 2018/0218422 A1 Aug. 2, 2018

(51) Int. Cl.
G06Q 30/00 (2012.01)
G06Q 30/06 (2012.01)
G06F 16/9535 (2019.01)

(52) U.S. Cl.
CPC ..... *G06Q 30/0623* (2013.01); *G06F 16/9535* (2019.01)

(58) Field of Classification Search
CPC .................................. G06Q 30/0601–0645
(Continued)

(56) References Cited
U.S. PATENT DOCUMENTS 7,996,282 B1    8/2011  Scott et al.
8,433,705 B1 *  4/2013  Dredze ............... G06F 17/30
                                                      707/723

(Continued)

OTHER PUBLICATIONS

Santra, A.K. & Jayasudha, S. 2012, "An Efficient Cluster Based Web Object Filters From Web Pre-Fetching and Web Caching on Web User Navigation", International Journal of Computer Science Issues (IJCSI), vol. 9, No. 3, pp. 483-489. (Year: 2012).*

Primary Examiner — Resha Desai
Assistant Examiner — Kennedy Gibson-Wynn
(74) Attorney, Agent, or Firm — Bryan Cave Leighton Paisner LLP

(57) ABSTRACT

A method including selectively aggregating a first set of filters for an item results list. The first set of filters can include multiple filter types, including category filters, facet filters, and price filters. The method also can include, for each filter in the first set of filters and each item in the item results list, determining user engagement statistics for the item when the filter has been applied. The method additionally can include generating a filter score for each filter in the first set of filters. The method further can include selecting a second set of filters from the first set of filters based on the filter scores of the filters in the second set of filters being above a threshold filter score. The method additionally can include applying space-constraint rules to the second set of filters to limit a quantity of filters in the second set of filters based on a ranking of the filters in the second set of filters and based on a screen size of a user device. The method further can include applying mutual-information rules to determine whether a mutual-information score for the second set of filters exceeds a predetermined mutual-information threshold. The method additionally can include after receiving a request to display a webpage that lists at least a portion of the item results list, coordinating a display of the webpage. The webpage can include a set of options to select each of the filters in the second set of filters when the mutual-information score for the second set of filters exceeds the predetermined mutual-information threshold. Other embodiments of related systems and methods are disclosed.

18 Claims, 7 Drawing Sheets

(58) Field of Classification Search
USPC .............................................. 705/26.1–27.2
See application file for complete search history.

(56) References Cited

U.S. PATENT DOCUMENTS

| | | | | |
|---|---|---|---|---|
| 8,548,876 | B1* | 10/2013 | Fox | G06Q 30/00 |
| | | | | 705/26.7 |
| 8,762,227 | B1 | 6/2014 | Fox et al. | |
| 8,918,381 | B1* | 12/2014 | Wang | G06F 17/30 |
| | | | | 707/705 |
| 8,983,930 | B2* | 3/2015 | Cheng | G06F 17/30 |
| | | | | 707/715 |
| 2012/0246026 | A1 | 9/2012 | Xu et al. | |
| 2012/0259882 | A1 | 10/2012 | Thakur et al. | |
| 2014/0172821 | A1* | 6/2014 | Hu | G06F 17/30 |
| | | | | 707/711 |
| 2014/0379520 | A1* | 12/2014 | Nemery | G06Q 30/0631 |
| | | | | 705/26.7 |
| 2015/0142609 | A1* | 5/2015 | Garera | G06Q 30/06 |
| 2015/0348160 | A1 | 12/2015 | Ravikant et al. | |
| 2015/0356186 | A1* | 12/2015 | Konik | G06F 17/30867 |
| 2016/0012135 | A1* | 1/2016 | Wang | G06F 17/30 |
| 2016/0125498 | A1* | 5/2016 | Setty | G06Q 30/0627 |
| 2016/0147893 | A1* | 5/2016 | Mashiach | G06F 17/30867 |

* cited by examiner

AUTOMATIC GENERATION OF FEATURED FILTERS

TECHNICAL FIELD

This disclosure relates generally to automatic generation of featured filters.

BACKGROUND

Modern consumers have many choices when selecting products to purchase. When shopping online for a particular type of item, consumers often have a general idea of what they want, but often would like to further limit the items displayed using relevant filters. For example, a search for a television (TV) can yield thousands of products, and there can be filters that further limit the results into subcategories, such as "LCD," "LED," and "Plasma" for the TV search. These filters can highlight relevant subcategories of products, summarize matching products, and/or enhance the user experience, such as by assisting consumers to more easily and/or rapidly see products that are relevant to their interests. Selection of featured filters is often done manually by merchants or product experts.

BRIEF DESCRIPTION OF THE DRAWINGS

To facilitate further description of the embodiments, the following drawings are provided in which.

Figure 1:
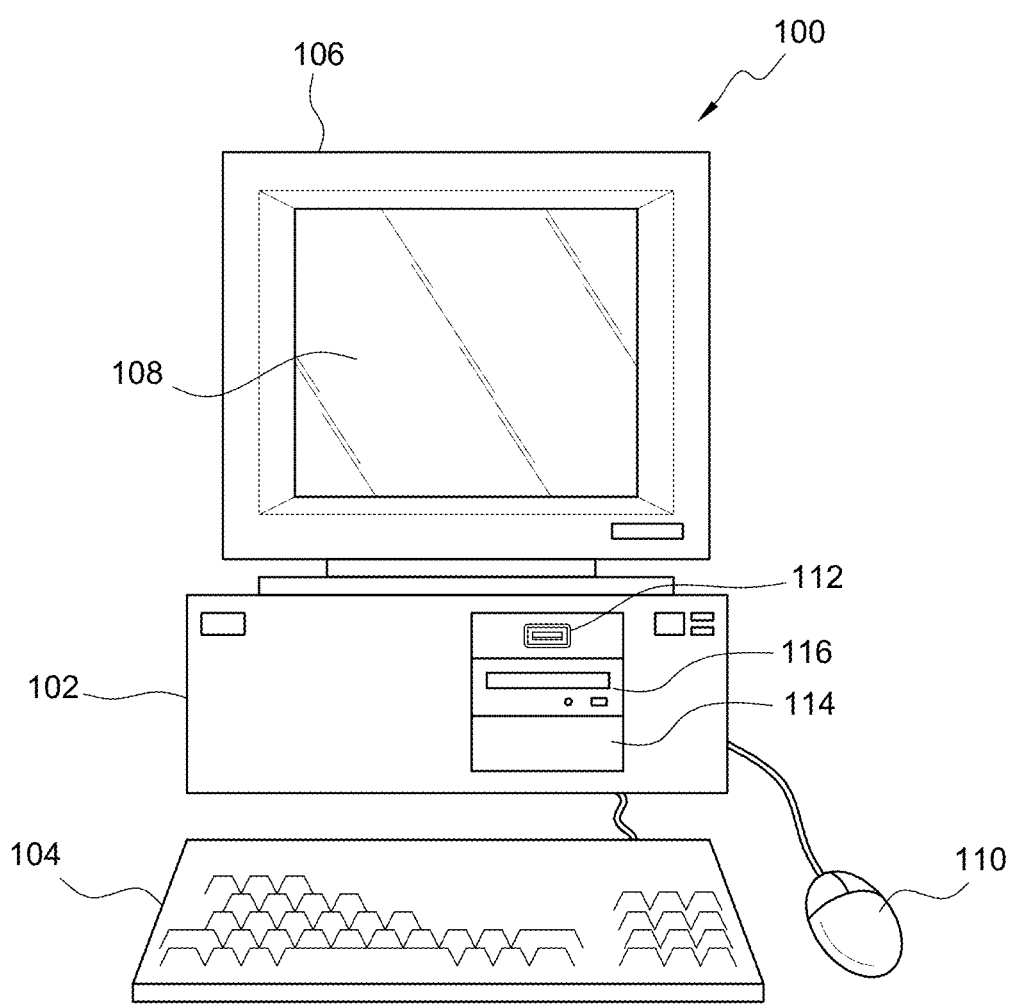
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a system include one or more processors and one or more non-transitory computer-readable media storing computing instructions configured to run on the one or more processors. The computing instructions can be configured to perform selectively aggregating a first set of filters for an item results list. The first set of filters can include multiple filter types. The multiple filter types of the first set of filters can include category filters, facet filters, and price filters. The computing instructions also can be configured to perform, for each filter in the first set of filters and each item in the item results list, determining user engagement statistics for the item when the filter has been applied. The computing instructions additionally can be configured to perform generating a filter score for each filter in the first set of filters. The computing instructions further can be configured to perform selecting a second set of filters from the first set of filters based on the filter scores of the filters in the second set of filters being above a threshold filter score. The computing instructions additionally can be configured to perform applying space-constraint rules to the second set of filters to limit a quantity of filters in the second set of filters based on a ranking of the filters in the second set of filters and based on a screen size of a user device. The computing instructions further can be configured to perform applying mutual-information rules to determine whether a mutual-information score for the second set of filters exceeds a predetermined mutual-information threshold. The computing instructions additionally can be configured to perform after receiving a request to display a webpage that lists at least a portion of the item results list, coordinating a display of the webpage. The webpage can include a set of options to select each of the filters in the second set of filters when the mutual-information score for the second set of filters exceeds the predetermined mutual-information threshold.

A number of embodiments include a method being implemented via execution of computing instructions configured to run at one or more processors and configured to be stored at non-transitory computer-readable media. The method can include selectively aggregating a first set of filters for an item results list. The first set of filters can include multiple filter types. The multiple filter types of the first set of filters can include category filters, facet filters, and price filters. The method also can include, for each filter in the first set of filters and each item in the item results list, determining user engagement statistics for the item when the filter has been applied. The method additionally can include generating a filter score for each filter in the first set of filters. The method further can include selecting a second set of filters from the first set of filters based on the filter scores of the filters in the second set of filters being above a threshold filter score. The method additionally can include applying space-constraint rules to the second set of filters to limit a quantity of filters in the second set of filters based on a ranking of the filters in the second set of filters and based on a screen size of a user device. The method further can include applying mutual-information rules to determine whether a mutual-information score for the second set of filters exceeds a predetermined mutual-information threshold. The method additionally can include after receiving a request to display a webpage that lists at least a portion of the item results list, coordinating a display of the webpage. The webpage can include a set of options to select each of the filters in the second set of filters when the mutual-information score for the second set of filters exceeds the predetermined mutual-information threshold.

Figure 2:
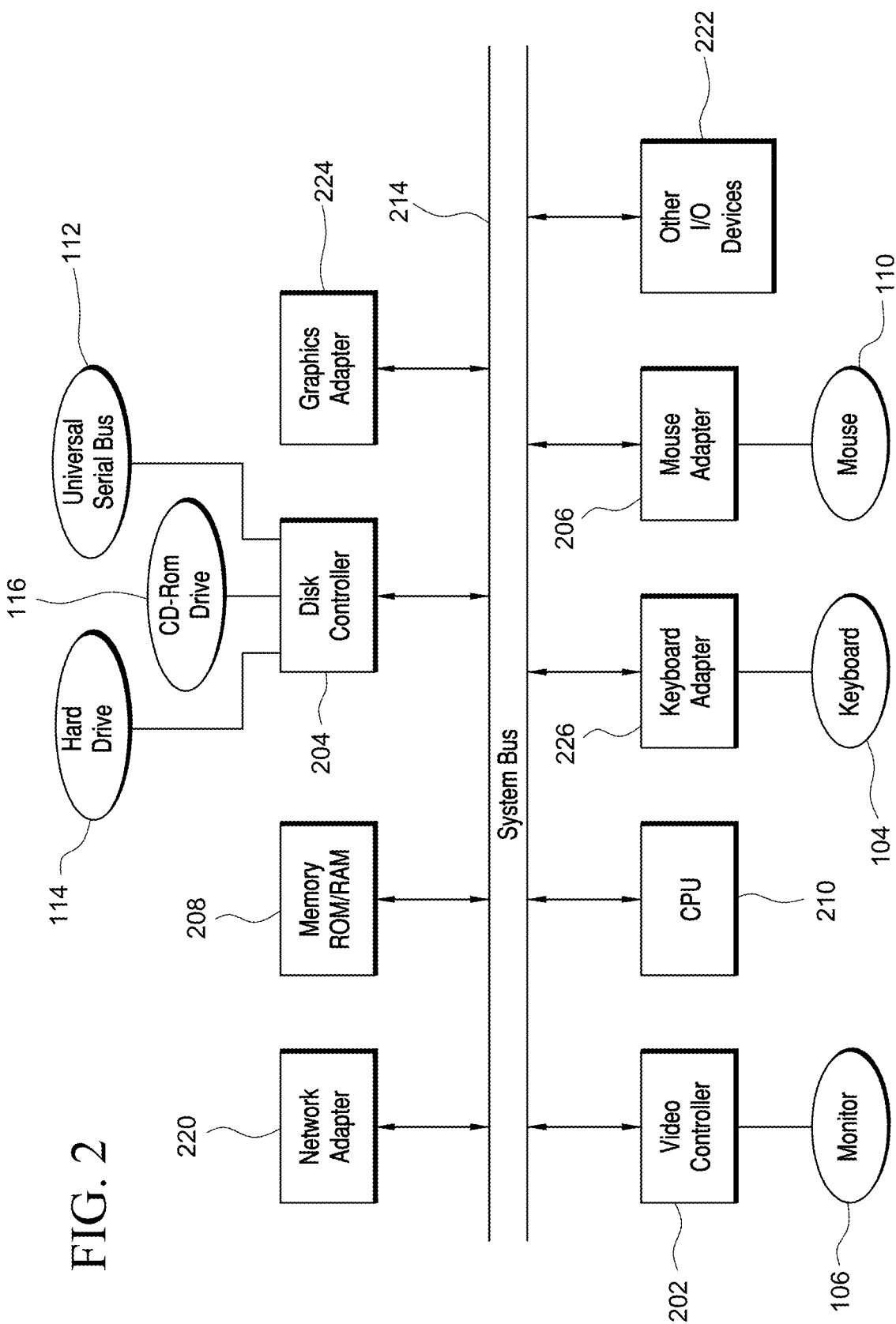
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM or DVD drive 116 (FIGS. 1-2). Non-volatile or non-transitory memory storage unit(s) refer to the portions of the memory storage units(s) that are non-volatile (e.g., non-transitory) memory. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can include Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
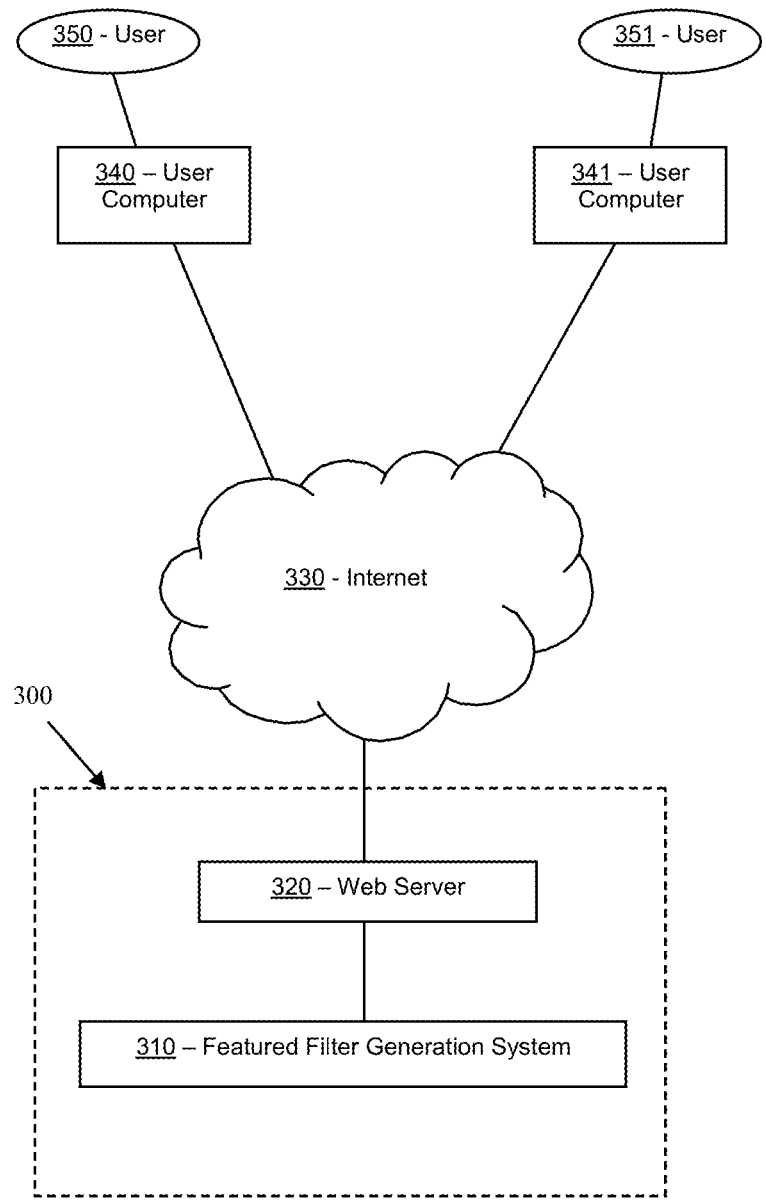
FIG. 3 illustrates a block diagram of a system that can be employed for automatic selection of featured filters, according to an embodiment.

Turning ahead in the drawings, FIG. 3 illustrates a block diagram of a system 300 that can be employed for automatic selection of featured filters, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a featured filter generation system 310 and/or a web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. Featured filter generation system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host featured filter generation system 310 and web server 320. Additional details regarding featured filter generation system 310 and web server 320 are described herein.

In some embodiments, web server 320 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. Web server 320 can host one or more websites. For example, web server 320 can host an eCommerce website that allows users to browse and/or search for products, to add products to an electronic shopping cart, and/or to purchase products, in addition to other suitable activities.

In some embodiments, an internal network that is not open to the public can be used for communications between featured filter generation system 310 and web server 320 within system 300. Accordingly, in some embodiments, featured filter generation system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices. used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, featured filter generation system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to featured filter generation system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of featured filter generation system 310 and/or web server 320. In a similar manner, the processors and/or the non-transitory computer-readable media can be local and/or remote to each other.

Meanwhile, in many embodiments, featured filter generation system 310 and/or web server 320 also can be configured to communicate with one or more databases. The one or more databases can include a product database that contains information about products, items, or SKUs (stock keeping units) sold by a retailer, for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between featured filter generation system 310 and/or web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
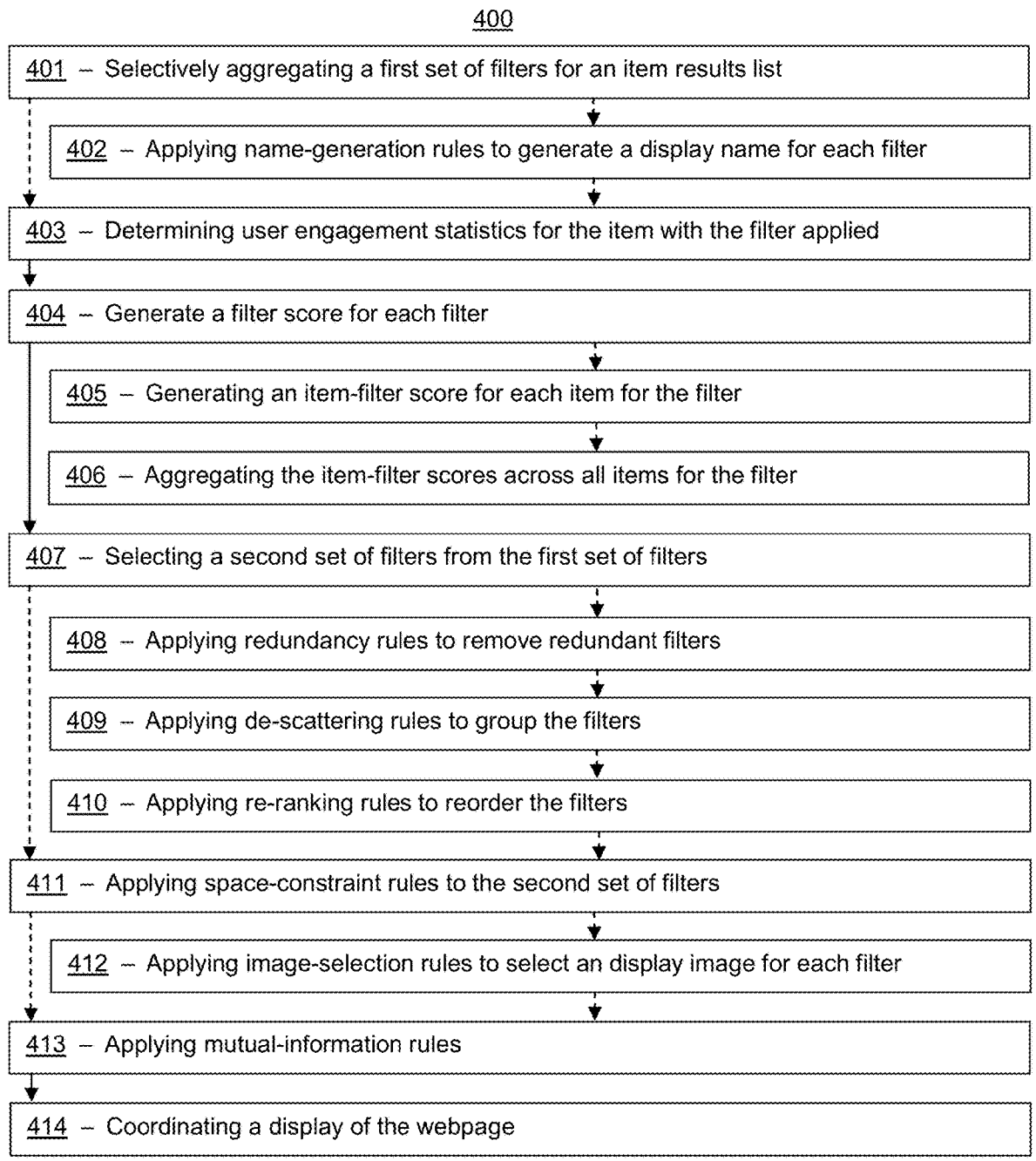
FIG. 4 illustrates a flow chart for a method, according to another embodiment.

Turning ahead in the drawings, FIG. 4 illustrates a flow chart for a method 400. In some embodiments, method 400 can be a method of automatically generating featured filters. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as featured filter generation system 310 (FIG. 3) and/or web server 320 (FIG. 3). The processor(s) can be similar or identical to the processor(s) described above with respect to computer system 100 (FIG. 1).

Referring to FIG. 4, method 400 can include a block 401 of selectively aggregating a first set of filters for an item results list. In a number of embodiments, the first set of filters can include multiple filter types. In several embodiments, the multiple filter types of the first set of filters can include category filters, facet filters, and price filters. In some embodiments, the item results list can be a search-query item results list. In such embodiments, the first set of filters further can include one or more query reformulations. In other embodiments, the item results list can be a category-browsing item results list. A search-query item results list can be a list of items (e.g., products) that is returned as a result of a search query. A category-browsing item results list can be a list of items (e.g., products) that is returned as a result of a category browsing action, such as selecting a category in a product taxonomy. In many embodiments, in an eCommerce website, the list of items can be presented in one or more webpages.

Figure 5:
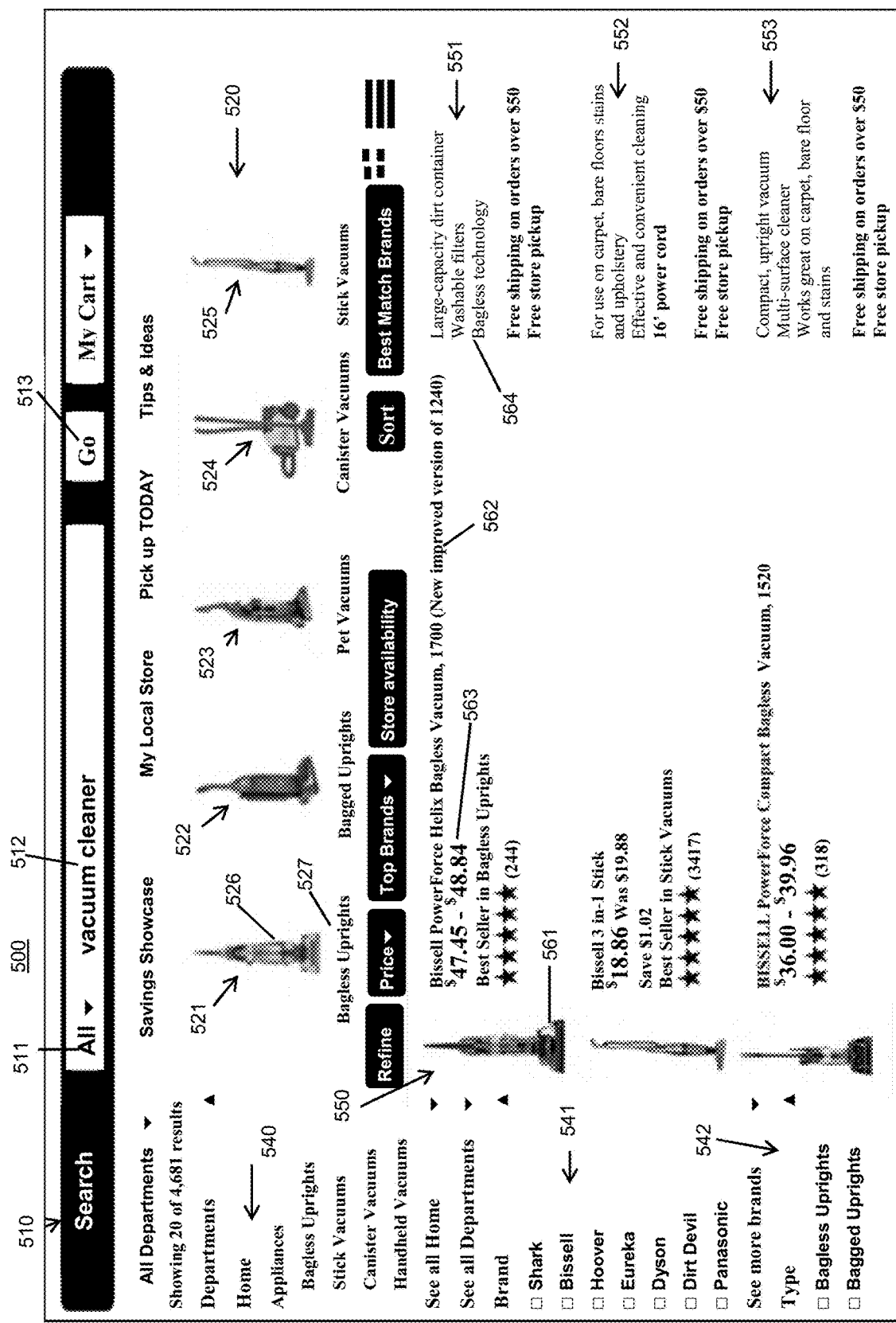
FIG. 5 illustrates a portion of an exemplary webpage showing a set of featured filters and an item result listing for a search query of "vacuum cleaner"

Turning ahead in the drawings, FIG. 5 illustrates a portion of an exemplary webpage 500 showing a set of featured filters 520 and an item result listing 550 for a search query of "vacuum cleaner." Webpage 500 is merely exemplary, and embodiments for automatically selecting featured filters can be employed in many different embodiments or examples not specifically depicted or described herein. In some embodiments, web server 320 (FIG. 3) can provide a webpage, such as webpage 500, to one or more of user computers (e.g., 340-341 (FIG. 3)), which can allow a user (e.g., 350-351 (FIG. 3)) to enter a search query and/or a category browsing action.

In some embodiments, webpage 500 can include a header bar 510, which can include a category selector 511, a search box 512, a search button 513, and/or other suitable elements. In many embodiments, the user (e.g., 350-351 (FIG. 3)) can enter the search query in search box 512, and webpage 500 can display the search query in search box 512 as the user (e.g., 350-351 (FIG. 3)) types in the search query. In many embodiments, a user (e.g., 350-351 (FIG. 3)) can indicate completion of a search query by selecting search button 513, hitting the ENTER key on the user's keyboard, or another suitable method of indicating that the search query is complete, upon which the search query can be sent from the user computer (e.g., 340-341 (FIG. 3)) to web server 320 (FIG. 3).

In many embodiments, after receiving a query from the user computer (e.g., 340-341 (FIG. 3)), web server 320 (FIG. 3) and/or featured filter generation system 310 (FIG. 3) can display item result listing 550, which can include one or more products that match the search query. For example, item result listing 550 can display all or a portion of the item result list, and in some embodiments, additional portions of the item result list can be included on subsequent webpages. Item result listing 550 can include items, such as items 551-553, for example. Each item displayed on webpage 500, such as item 551, can include item information, such as an image 561, a title 562, a price 563, a description 564, and/or other suitable information, such as a customer rating, special deals, etc.

In many embodiments, each item, such as item 551 can include a set of facet values, which can specify values for that item for specific facets. For example, facets can be similar or identical to item attributes, and facet values can be similar or identical to values corresponding to the attributes in attribute-value pairs. For example, a certain vacuum cleaner product can have, at least in part, the following facets and facet values:

| FACET | FACET VALUE |
|---|---|
| Brand | Bissell® |
| Type | Bagless Upright |

In many embodiments, products that can be searched on the website can include non-physical goods, virtual goods, services, online video portals, travel options, hotel/vacation rentals, events, etc.

After receiving a search query for "vacuum cleaner," for example, webpage 500 can display in item result listing 550 at least a portion of the item results list that match the search query. In a number of embodiments, webpage 500 also can list various category filters, facet filters, and/or price filters. For example, webpage 500 can include a category filters listing 540, which can include categories of a product taxonomy related to the search query. By selecting one of the categories listed in category filters listing 540, the user (e.g., 350-351 (FIG. 3)) can choose to limit (e.g., filter) the items displayed to items that a categorized within the selected category in the product taxonomy.

As another example, webpage 500 can include a brand filters listing 541, which can include facet values for the facet of "brand." By selecting one of these facet values (e.g., Bissel® 1), the user (e.g., 350-351 (FIG. 3)) can choose to limit (e.g., filter) the items displayed to items that have a facet value that matches the facet value selected (e.g., Bissell®). As yet another example, webpage 500 can include a type filters listing 542, which can include facet values for the facet of "type." By selecting one of these facet values (e.g., Bagless Uprights), the user (e.g., 350-351 (FIG. 3)) can choose to limit (e.g., filter) the items displayed to items that have a facet value that matches the facet value selected (e.g., Bagless Uprights). In many embodiments, other facet filters can be displayed for other facets in the webpage (e.g., 500).

In several embodiments, price filters (not shown) can be displayed in webpage 500 for various price ranges, such as a price filter for $0-$50, a price filter for $50-100, a price filter for $100-200, a price filter for $200-500, and a price filter for $500-$1000. In many embodiments, the category filters, facet filters, and/or price filters shown in webpage 500 can be tailored to be relevant to the item result list displayed at least partially in item results listing 550, such that selecting a filter will further limit the item result list. In many embodiments, only some of the possible category filters, facet filters, and/or price filters are shown in webpage 500.

In many embodiments, after receiving a search query, such as vacuum cleaner, webpage 500 can list various query reformulations (not shown). For example, if a user searches on a misspelling or an unusual form of a query, the query reformulations can list one or more reformulations of the query that can yield better and/or different results in the item results list. In many embodiments, query reformulations for a search query can be subsequent search queries searched by users (e.g., 350-351 (FIG. 3)) after the search query in an attempt to further refine or otherwise reformulate the search query. These query reformulations can be collected from historical user logs of the user and/or other users.

In many embodiments, webpage 500 can include a set of featured filters 520, which can include featured filters, such as featured filters 521-525. In several embodiments, each of the featured filters (e.g., 521-525) can include a display image, a display name, and can be associated with filtering criteria. For example, featured filter 521 can have a display name 527 of "Bagless Uprights" and a display image 526 associated with bagless upright vacuum cleaners. In many embodiments, if the user (e.g., 350-351 (FIG. 3)) selects featured filter 521, a filtering criteria can be applied that limits the item results list shown in item results listing 550 to items in the search results for "vacuum cleaners" that also have a facet value of "Bagless Uprights" for the facet of "type." In many embodiments, each of the featured filters (e.g., 521-525) can be associated with different filtering criteria, can have a different display name (e.g., 527), and can have a different display image (e.g., 526). In conventional webpages, featured filters (e.g., 521-525) are typically selected by merchants or product experts. In a number of embodiments, system 300 can automatically generate the featured filters (e.g., 521-525), as described herein.

Figure 6:
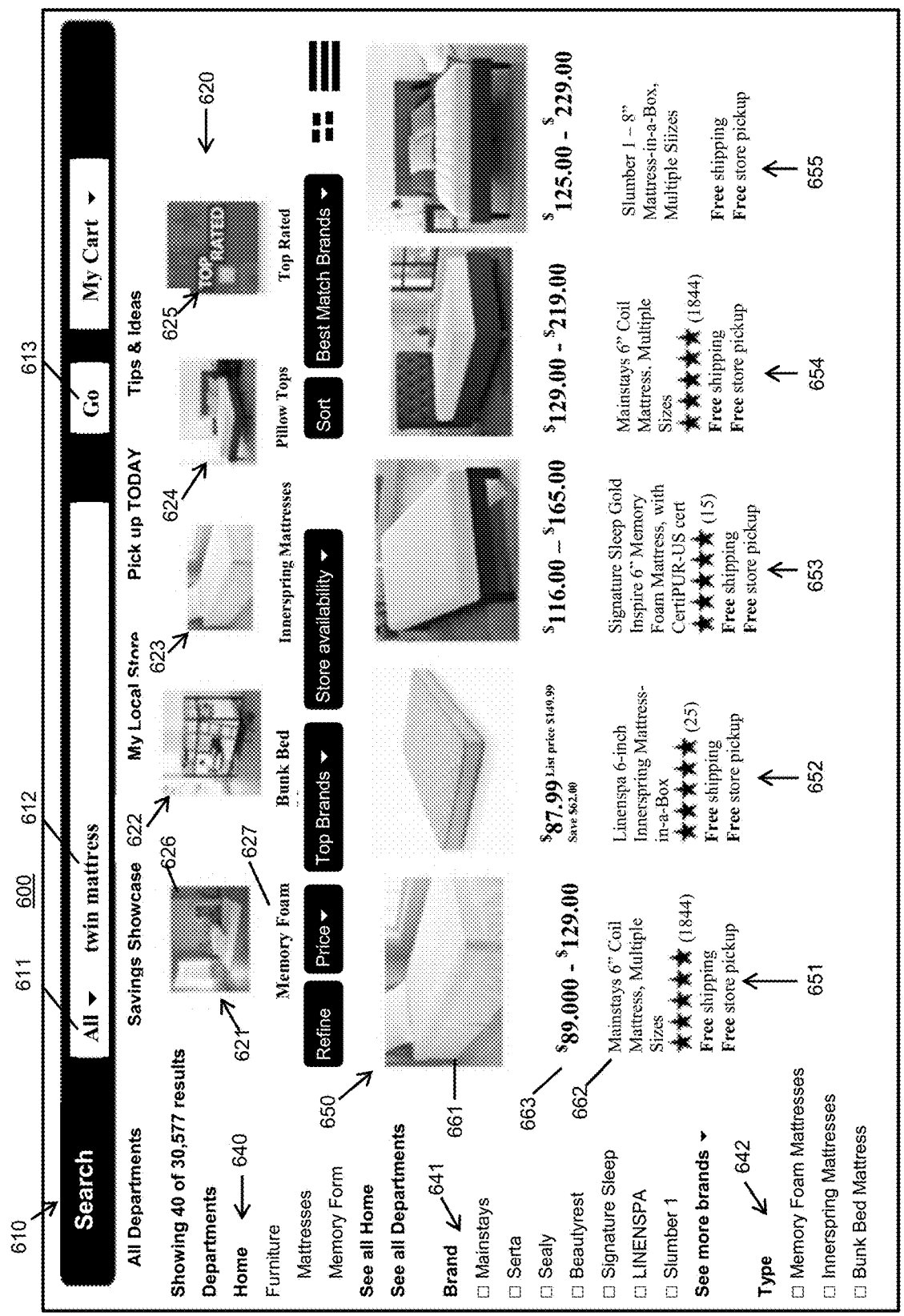
FIG. 6 illustrates a portion of an exemplary webpage showing a set of featured filters and an item result listing for a search query of "twin mattress"

Turning ahead in the drawings, FIG. 6 illustrates a portion of an exemplary webpage 600 showing a set of featured filters 620 and an item result listing 650 for a search query of "twin mattress." Webpage 600 is merely exemplary, and embodiments for automatically selecting featured filters can be employed in many different embodiments or examples not specifically depicted or described herein. In some embodiments, web server 320 (FIG. 3) can provide a webpage, such as webpage 600, to one or more of user computers (e.g., 340-341 (FIG. 3)), which can allow a user (e.g., 350-351 (FIG. 3)) to enter a search query and/or a category browsing action. Webpage 600 can be similar to webpage 500 (FIG. 5), and various elements of webpage 600 can be similar or identical to various elements of webpage 500 (FIG. 5).

In a number of embodiments, webpage 600 can include a header bar 610, which can include a category selector 611, a search box 612, a search button 613, and/or other suitable elements. Header bar 610 can be similar or identical to header bar 510 (FIG. 5). Category selector 611 can be similar or identical to category selector 511 (FIG. 5). Search box 612 can be similar or identical to search box 512 (FIG. 5). Search button 613 can be similar or identical to search button 513 (FIG. 5). In many embodiments, webpage 600 can include item result listing 650, which can display all or a portion of an item result list. Item result listing 650 can be similar to item result listing 550 (FIG. 5). In several embodiments, item result listing 650 can include items, such as items 651-555, for example. Items 651-655 can be similar to items 551-553 (FIG. 5). Each item displayed on webpage 600, such as item 651, can include item information, such as an image 661, a title 662, a price 663, and/or other suitable information, such as a description, a customer rating, special deals, etc.

After receiving a search query for "twin mattress," for example, webpage 600 can display in item result listing 650 at least a portion of the item results list that match the search query. In a number of embodiments, webpage 600 also can list various category filters, facet filters, and/or price filters. For example, webpage 600 can include a category filters listing 640, which can include categories of a product taxonomy related to the search query. Category filters listing 640 can be similar to category filters listing 540 (FIG. 5), but can include categories related to the search query of "twin mattress," instead of the search query of "vacuum cleaner," such as "Furniture," "Mattresses," "Memory Foam," etc. As another example, webpage 600 can include a brand filters listing 641, which can include facet values for the facet of "brand." Brand filters listing 641 can be similar to brand filters listing 541 (FIG. 5), but can include brands related to the search query of "twin mattress," instead of the search query of "vacuum cleaner," such as "Mainstays®,"

"Serta®," "Sealy®," etc. As yet another example, webpage 600 can include a type filters listing 642, which can include facet values for the facet of "type." Type filters listing 642 can be similar to type filters listing 641 (FIG. 5), but can include types related to the search query of "twin mattress," instead of the search query of "vacuum cleaner," such as "memory foam mattress," "innerspring mattresses," etc. In several embodiments, price filters (not shown) can be displayed in webpage 600 for various price ranges, as described above in connection with webpage 600. In some embodiments, query reformulations (not shown) can be displayed in webpage 600, as described above in connection with webpage 500.

In many embodiments, webpage 600 can include a set of featured filters 620, which can include featured filters, such as featured filters 621-625. Featured filters 621-625 can be similar to featured filters 521-525 (FIG. 5), but can include types related to the search query of "twin mattress," instead of the search query of "vacuum cleaner." In several embodiments, each of the featured filters (e.g., 621-625) can include a display image, a display name, and can be associated with filtering criteria. For example, featured filter 621 can have a display name 627 of "Memory Foam" and a display image 626 associated with memory foam twin mattresses.

Returning to FIG. 4, block 401 of selectively aggregating a first set of filters for an item results list can include aggregating the filters, such as category filters, facet filters, price filters, and/or query reformulations that a relevant to the item results list. In many embodiments, the filters that correspond to the item results list can be predetermined using conventional methods, and those filters can all be aggregated to determine the first set of filters. In many embodiments, block 401 of selectively aggregating a first set of filters for an item results list can be performed based on each item results list of predetermined item results lists for search queries and/or category browsing activities that have been performed in the past by the user and/or other users. In several embodiments, the filters in the first set of filters can be similar to the filters in category filters listing 540 (FIG. 5), brand filters listing 541 (FIG. 5), type filters listing 542 (FIG. 5), category filters listing 640 (FIG. 6), brand filters listing 641 (FIG. 6), type filters listing 642 (FIG. 6), the price filters described above, and/or the query reformulations described above. In a number of embodiments, the item results list can be similar or identical to the items displayed, at least in part, in item results listing 550 (FIG. 5) and/or item results listing 650 (FIG. 6). In many embodiments, block 401 of aggregating the first set of filters can be performed separately for each item results list, such as for each search query and/or for each category browse selection.

In many embodiments, each filter of the first set of filters can have been applied to the item results list, such that the aggregation of filters in the first set of filters is selective. For example, the filters included in the first set of filters can be limited to those filters that have been engaged (e.g., selected) by users (e.g., 350-351 (FIG. 3)) in the past, such as the previous 30 days, 60 days, 90 days, 6 months, 1 year, or another suitable time period, when presented with the item results list, such as in item results listing 550 (FIG. 5) or 650 (FIG. 6). For example, the filters that are aggregated can be those filters that were used to limit and/or otherwise alter the item result list based on the filter. In several embodiments, the engagement data can be stored in historical user logs.

In several embodiments, method 400 optionally can include a block 402 of applying name-generation rules to generate a display name for each filter in the first set of filters based on a type of the filter. The display name can be similar display name 527 (FIG. 5) and/or display name 627 (FIG. 6). Generation of the display name can be rule based. The rules can be registered and/or updated manually, for example. As an example, for query formulations, the rule can be to use as the display name the spell-checked, or otherwise normalized, reformulated query. As another example, for category filters, the display name can be the name of the category in the taxonomy. As an additional example, for facet filters, the display name can be the facet value of the facet, unless there is an override rule. As yet another example, for price filters, a predetermined price range format can be used, such as "Under $x," "$x-$y," "Above $y." etc.

In a number of embodiments, method 400 also can include a block 403 of determining user engagement statistics for the item when the filter has been applied, which can be performed for each filter in the first set of filters and each item in the item results list. In many embodiments, the user engagement statistics can include item impressions when the filter is applied, which can be represented as imps[f, x], where f represents the filter applied and x is the item in the item results list. For example, if for the item results list, the filter f was applied by a user (e.g., 350-351 (FIG. 3)), and the item x was then shown to the user in the item results listing (e.g., 550 (FIG. 5), 650 (FIG. 6)) after the filtering, that action would be counted as an impression. The imps[f, x] statistics thus can represent the number of times users (e.g., 350-351 (FIG. 3)) were shown the item x in the item results listing (e.g., 550 (FIG. 5), 650 (FIG. 6)) when filtered by filter f.

In several embodiments, the user engagement statistics also can include item clicks when the filter is applied, which can be represented as clicks[f, x]. For example, if for the item results list, the filter f was applied by a user (e.g., 350-351 (FIG. 3)), and the item x was then shown to the user in the item results listing (e.g., 550 (FIG. 5), 650 (FIG. 6)) after the filtering, and the user clicked on the item x to view the individual item, that action would be counted as a click. As a simple example, if a user (e.g., 350-351 (FIG. 3)) searches on the query "tv," and adds a filter f="facet=brand: LG," and the user clicks on an item x="42 inch LG TV," that action would result in an impression for filter f and item x. The clicks[f, x] statistics thus can represent the number of times users (e.g., 350-351 (FIG. 3)) clicked on the item x in the item results listing (e.g., 550 (FIG. 5), 650 (FIG. 6)) when filtered by filter f.

In a number of embodiments, the user engagement statistics additionally can include add-to-carts when the filter is applied, which can be represented as atc[f, x]. For example, if for the item results list, the filter f was applied by a user (e.g., 350-351 (FIG. 3)), and the item x was then shown in the item results listing (e.g., 550 (FIG. 5), 650 (FIG. 6)) after the filtering, and the user added the item to the cart (e.g., virtual cart), that action would be counted as an add-to-cart. The atc[f, x] statistics thus can represent the number of times users (e.g., 350-351 (FIG. 3)) added to the cart the item x directly or indirectly through the item results listing (e.g., 550 (FIG. 5), 650 (FIG. 6)) after the item result listing has been filtered by filter f. In some embodiments, the add-to-cart can take place directly when the user is viewing the item results listing (e.g., 550 (FIG. 5), 650 (FIG. 6)), as filtered by filter f In other embodiments, the add-to-cart can take place indirectly when the user is viewing the individual item x, such as after having viewed the item results listing (e.g., 550 (FIG. 5), 650 (FIG. 6)), as filtered by filter f.

In a number of embodiments, the user engagement statistics additionally can include item orders when the filter is applied, which can be represented as orders[f, x]. For example, if for the item results list, the filter f was applied by a user (e.g., 350-351 (FIG. 3)), and the item x was then shown in the item results listing (e.g., 550 (FIG. 5), 650 (FIG. 6)) after the filtering, and the user ordered the item (e.g., purchased the item), that action would be counted as an order. The order[f, x] statistics thus can represent the number of times users (e.g., 350-351 (FIG. 3)) ordered the item x directly or indirectly through the item results listing (e.g., 550 (FIG. 5), 650 (FIG. 6)) after the item result listing has been filtered by filter f. In some embodiments, the order can take place directly when the user is viewing the item results listing (e.g., 550 (FIG. 5), 650 (FIG. 6)), as filtered by filter f In other embodiments, the order can take place indirectly when the user is viewing the individual item x, such as after having viewed the item results listing (e.g., 550 (FIG. 5), 650 (FIG. 6)), as filtered by filter f In yet other embodiments, the order can take place indirectly when the user is in a virtual cart checkout after having added the item to the virtual cart either when viewing the item results listing (e.g., 550 (FIG. 5), 650 (FIG. 6)) or when viewing the individual item x.

In many embodiments, the user engagement statistics can be are based on a previous at least 90 days of historical user logs, which track imps[f, x], clicks[f, x], atc[f, x], and/or orders [f, x]. In other embodiments, the user engagement statistics can be based on the previous 30 days, 60 days, 90 days, 6 months, 1 year, or another suitable time period of the historical user logs. Although the notation for these user statistics is based on filter f and item x, these user statistics can be tracked separately for each original item results listing corresponding to a search query or a category browsing activity.

In several embodiments, a filter f_0 can be defined to track the user engagement statistics when no filter is engaged, and can be considered an imaginary filter of no filters being engaged. In other words, imps[f_0, x], clicks [f_0, x], atc[f_0, x], and/or orders [f_0, x] denote the user engagement statistics for which item x is engaged (e.g., impressions, clicks, add-to-carts, and/or orders) without any filter being engaged at the time—that is, engagement at the original item results listing (e.g., 550 (FIG. 5), 650 (FIG. 6)) before any filtering. This user engagement without filtering can be referred to as the "organic engagement" of the original search query or category browsing activity.

In several embodiments, method 400 additionally can include a block 404 of generating a filter score for each filter in the first set of filters. In many embodiments, the filter score can be obtained for each filter using the user engagement statistic.

In a number of embodiments, block 404 can include a block 405 of generating an item-filter score for each item in the item results list for the filter. In some embodiments, the item-filter score can be calculated for each item-filter pair as follows:

$$score[f,x]=\max(0,a\_0+a\_1*imps[f,x]+a\_2*clicks[f,x]+a\_3*atc[f,x]+a\_4*orders[f,x]),$$

where score[f, x] is the item-filter score for the item-filter pair, and a_0, a_1, a_2, a_3, and a_4 are weighting parameters.

In many embodiments, the weighting parameters a_0, a_1, a_2, and a_4 can be obtained through linear regression. Specifically, the following formula can be regressed:

$$atc \sim a\_0+a\_1*imps+a\_2*clicks+a\_4*orders,$$

in which imps, clicks, and orders are global data for imps[f, x], clicks[f, x], and orders [f, x], respectively aggregated for each value across all item-filter pairs. In various embodiments, the weighting parameter a_3 can be chosen manually, such as being assigned the value of 1 or another suitable value.

In some embodiments, after the item-filter score, score[f, x], is generated for each item-filter pair, item-filter pairs with negative scores (e.g., item-filter pairs in which score[f, x]<0) can be dropped.

In several embodiments, block 404 also can include a block 406 of aggregating the item-filter scores across all items in the item result list for the filter. For example, the filter score for a filter f can be calculated by aggregating the item-filter scores across all items x for the filter f, as follows:

$$score[f]=\text{sum}\_\{x\}score[f,x],$$

where score[f] is the filter score for filter f.

In a number of embodiments, method 400 further can include a block 407 of selecting a second set of filters from the first set of filters based on filter scores of the filters in the second set of filters being above a threshold filter score. For example, in many embodiments, the filters can be ranked according to the filter score, score[f], and a cutoff can be applied to remove any filters below the threshold filter score. In some embodiments, the threshold filter score can be a predetermined filter score. In other embodiments, the threshold filter score can be a predetermined percentage of a highest filter score from among the filter scores for the filters in the first set of filters. For example, the predetermined percentage can be denoted T, which can be tuned based on human judgment. As an example, T can be set to 1%, 5%, 10%, 20%, or another suitable percentage. Thus, filter f can be removed if:

$$score[f]<T*\max\_(f')score[f'],$$

where f' is the filter with the highest filter score among all the filter scores.

In several embodiments, method 400 optionally can include a block 408 of applying redundancy rules to remove redundant filters from the second set of filters. In many embodiments, block 408 can be performed after block 407 and before block 411, which is described below. In some embodiments, the redundancy rules can remove duplicate, irrelevant and/or redundant filters. In many embodiments, the redundancy rules can be based on duplication of the display name and/or similarities of engaged item. As block 401 involves aggregated filters of multiple types, such as query reformulations, facet filters, category filters and/or price filters, some of the filters can be duplicates and/or have redundant effects. For example, for a search query of "tv", a query reformulation filter of "LG tv" would be a duplicate of applying a facet filter of "facet=brand:LG." As another example, if the intent in the original query is more focused compared the intent of the filter, the filter can be considered redundant. To illustrate, for a query of "tv", a category filter "category=Electronics" would be redundant, as the original intent is already narrower than the filter. In other words, applying the filter would not provide the customer with any beneficial filtering.

In many embodiments, applying the redundancy rules can first involve "cleaning" of the filter display name. "Cleaning" can involve stemming and/or stopword removal. For example, for a filter "category=Tablets for Kids," the cleaned display name can be "Tablet Kid."

In several embodiments, applying the redundancy rules can include removing a filter if the filter is redundant. A filter can be considered redundant, in some embodiments, if its cleaned display name is a string subset of the search query or the category browsing display name for the item results list that includes the filter. For example, for a search query "samsung tvs on clearance," a filter with a display name "Samsung TVs" can be removed as redundant, as its cleaned display name form of "samsung tv" is a string subset of the cleaned form of the original search query "samsung tv clearance."

In many embodiments, applying the redundancy rules also can include removing a filter if another filter with the same filter type is redundant with the filter. For example, because a filter of "facet=brand:Samsung" is redundant for the search query of "samsung tv clearance," then the redundancy rules can remove all other brand facet filters (e.g., for different brands other than Samsung), as those filters can be considered to be irrelevant.

In several embodiments, applying the redundancy rules additionally can include removing a filter if its cleaned display name is a string subset of the cleaned display name of another filter that has a higher score. For example, for a search query of "tv," a category filter of "category=4K UHD tvs" and a facet filter of "resolution=4K UHD" have identical cleaned display names. In this case, the redundancy rules can select the filter with the highest score and discard the other filter. In some embodiments, in the special case in which the cleaned display names are identical, the redundancy rules can merge the scores, such as by adding the score of the removed filter to the other (non-removed) filter.

In many embodiments, applying the redundancy rules further can include removing a filter if the items the user engages with after engaging (e.g., selecting or clicking on) the filter is a subset of the items the user engages with after clicking on another filter with a higher score. This determination can be based on the item-filter score. For example, for a query, "vacuum cleaner," with a facet filter f of "brand=iRobot," and a facet filter f' of "type=Robotic Vacuum Cleaners," although the filters f and f' do not have similar display names, the items listed after engaging filter f is a subset of the items listed after engaging filter f', as the iRobot brand only produces robotic vacuum cleaners. The filter f includes other items in addition to those listed for the filter f, as there are robotic vacuum cleaners for other brands as well. Formally, filter f can be removed if there exists another filter f' such that score[f']>score[f], and $$\{x:\text{score}[f,x]>0\}\subseteq\{x:\text{score}[f',x]>0\}.$$

In a number of embodiments, method 400 also optionally can include a block 409 of applying de-scattering rules to group the filters in the second set of filters. In many embodiments, block 409 can be performed after block 407 and before block 411, which is described below. In some embodiments, the de-scattering rules can group the filters in the second set of filters by the type of filter (e.g., category filters, facet filters, price filters, query reformulations) and/or by facet within the facet filters. For example, if the top 7 filters by filter score are {f_1, f_2, f_3, f_4, f_5, f_6, f_7}, such that score[f_1]>score[f_2]>score[f_3]>score [f_4]>score[f_5]>score[f_6]>score[f_7], and the filters specifically are f_1 of screen size=40"-50", f_2 of brand:LG, f_3 of resolution=1080p, f_4 of price=$500-$750, f_5 of brand: Samsung, f_6 of screen size:50"-60", and f_7 of facet=screen size:30"-40", then the de-scattering rules can group the filters for the screen size facet, namely f_1, f_6, and f_7, into a single group, and/or can group the filters for the brand facet, namely f_2 and f_5, into a single group, such that those filters are not scattered across the ranking of the top 7 filters. In many embodiments, the group can be ordered in the ranking based on the ranking of the filter with the highest score in the group. In the example described above, the new ranking of the filters would be {f_1, f_6, f_7, f_2, f_5, f_3, f_4}, based on de-scattering the screen size facet filters, {f_1, f_6, f_7}, and the brand facet filters, {f_2, f_5}.

In various embodiments, it may not be desired to offer multiple different types of filters in the featured filters. For example, it may not be desirable to list facet filters for brand, screen size, and resolution all in the same set of featured filters.in the same n-ups. In some embodiments, depending on context, the de-scattering rules can retain only filters of a particular type. For the example above, only filters f_1, f_6, and f_7 of screen size can be retained, and the other types of filters can be removed. In other embodiments, the de-scattering rules can maintain filters of multiple different types of filters.

In several embodiments, method 400 further optionally can include a block 410 of applying re-ranking rules to reorder the filters in the second set of filters. In many embodiments, block 410 can be performed after block 407 and before block 411, which is described below. In some embodiments, the re-ranking rules can re-order the filters in a logical order. For example, in the example described above in block 409, the first three filters after applying the de-scattering rules are f_1 of screen size=40"-50", f_6 of screen size:50"-60" and f_7 of facet=screen size:30"-40". The facet of screen size has a logical order, namely a numerical order. The re-ranking rules thus can re-order the first three filters such the screen size facet value is in an decreasing numerical order, such that the new ordering of the first three filters is {f_6, f_1, f_7}. In other embodiments, the re-ranking rules can re-order the filters in an increasing numerical order. In some embodiments, the re-ranking rules can maintain the pre-existing order for certain types of filters. For example, for brand filters, there is logical order of brands that is particularly helpful to the user, so the re-ranking rules can keep the popularity order (based on filter score), and/or the de-scattered order based on the processing in block 409.

In a number of embodiments, method 400 additionally can include a block 411 of applying space-constraint rules to the second set of filters to limit a quantity of filters in the second set of filters based on a ranking of the filters in the second set of filters and based on a screen size of a user device. In many embodiments, the user device can be similar or identical to user computers 340-341 (FIG. 3). In many embodiments, the space-constraint rules can include limiting the second set of filters to the first n filters from the second set of filters, as ranked in block 407 and/or re-ordered in blocks 408, 409, and/or 410. In some embodiments, the parameter n can be based on a screen size of the user device. For example, if the user device is a mobile device, n can be 3. In other embodiments, n can be another suitable number, such as 2, 4, or 5, for example. If the user device is a desktop computer, n can be 5. In other embodiments, n can be another suitable number, such as 3, 4, 6, 7, or 8. Due to redundancy rules and/or an aggressive choice of parameter T in the threshold filter score of block 407. In many embodiments, the number of filters in the second set of filters before applying the space-constraint rules can be less than or equal to n, in which the space-constraint rules do not limit the number of filters in the second set of filters.

In several embodiments, method 400 optionally can include a block 412 of applying image-selection rules to select a display image for each filter in the second set of filters. The display image can be similar display image 526 (FIG. 5) and/or display images 626 (FIG. 6). In many embodiments, for each of the n filters in the second set of filters, as limited in block 411, image-selection rules can be applied to select a display image for the filter. In some embodiment, the image-selection rules can include, for each filter, identifying a set of item images that would be good representations of the filter. The item images can be selected from images associated with items that are engaged when the filter is applied. In many embodiments, this set of images can be identified via supervised image classification. Based on the item images selected and the filters (for which item-filter score is positive), the image-selection rules can train a model that learns features from images that detect labels. For this task, deep-learning techniques can be utilized. In many embodiments, the selection of the set of item images can be done using conventional techniques, such as supervised image classification.

In many embodiments, for each filter, after a representative set of item images are identified, the image-selection rules can select a display image by choosing the item image in the set of item images with the highest product-image score. In many embodiments, the item-image score can be calculated as follows:

item-image score=item-filter score*log(item price), where item-image score is the item-image score to be calculated, item-filter score is the item-filter score of the item for the filter, and item price is the price of the item. The item price can be factored into the item-image score to compensate for the fact that item popularity (e.g., user engagement) is often biased towards cheaper items. However, cheaper items often do not have an image as appealing as expensive items.

In a number of embodiments, the image-selection rules can de-duplicate the images. If the image for a filter is the same as the image of another filter with a higher score, then the image-selection rules can use the image of the item with next highest item-image score for the filter.

In a number of embodiments, method 400 further can include a block 413 of applying mutual-information rules to determine whether a mutual-information score for the second set of filters exceeds a predetermined mutual-information threshold. In many embodiments, the mutual-information can determine whether showing the n featured filters in the second set of filters would lead to a better experience to the user (e.g., 350-351 (FIG. 3)), as compared to not showing the n featured filters. Showing the featured filters is not particularly free, as it could lead to a worse experience, compared to not showing the n featured filters, because: (a) featured filters occupy some space above the item results listing (e.g., 550 (FIG. 5), 650 (FIG. 6)), which pushes results below the featured filters, thus introducing position bias and increasing friction in engaging with a product; (b) the webpage (e.g., 500 (FIG. 5), 600 (FIG. 6)) that includes the featured filters can lead to a worse experience than the original query, and (c) engaging with the featured filters can introduce additional friction to converging to an item, as it can require 2 clicks (e.g., 1 for featured filter, and 1 for clicking on the item), instead of 1 click for cling on the item, in order to converge to an item.

To determine if showing the featured filters is favorable, in several embodiments, the mutual-information rules can look at the information gain that the featured filters provide to the user (e.g., 350-351 (FIG. 3)). Denote the top n filters are f_1, f_2, . . . , f_n, respectively. As described above, f_0 represents an imaginary filter that is engaged when no other filter is engaged, representing the engagement when no filters are engaged. The item-filter scores for these filters are represented by score[f_i,x] for i in 0, 1, . . . ,n, as described above. In many embodiments, the mutual-information rules can normalize the item-filter scores (score[f_i,x] for i in 0, 1, . . . , n, and all x such that score[f_i,x]>0), to obtain random variables F and X, with joint probability distribution, Pr, calculated as follows:

$$Pr(F = f_i, X = x) = \frac{\text{score}[f_i, x]}{\Sigma_{i,x} \text{ score}[f_i, x]}.$$

In many embodiments, the mutual-information rules can then calculate the mutual information, I, of the random variables F and X, as follows:

$$I(F; X) = \sum_{i,x} Pr(F = f_i, X = x) \log\left(\frac{Pr(F = f_i, X = x)}{Pr(F = f_i,) Pr(X = x)}\right)$$

In a number of embodiments, the mutual-information rules next can determine if the mutual information exceeds a predetermined parameter, $\xi$. In other words, $I(F; X) > \xi$. In many embodiments, the parameter $\xi$ can be predetermined and tuned manually, such as based on evaluations and/or crowdsource judgments. If the mutual information exceeds the predetermined parameter, $\xi$, the mutual-information rules can recommend displaying the featured filters; otherwise the mutual-information rules can recommend not displayed the featured filters. By displaying the featured filters only when the mutual information exceeds the predetermined parameter, $\xi$, the mutual-information rules can beneficially ensure that the featured filters together provide some information about the item that user (e.g., 350-351 (FIG. 3)) is interested in. As an example in the extreme case in which featured filters would not be displayed, if there is only one item, i.e., Pr(X=x)=1 for some x, then I(F; X)=0, and showing filters would provide no additional information about the item that user is looking for.

In several embodiments, method 400 additionally can include a block 414 of, after receiving a request to display a webpage that lists at least a portion of the item results list, coordinating a display of the webpage. In many embodiments, the webpage includes a set of options to select each of the filters in the second set of filters when the mutual-information score for the second set of filters exceeds the predetermined mutual-information threshold. In a number of embodiments, the request to display the webpage can be a search query from a user operating the user device. In other embodiments, the request to display the webpage can be a category browse request from a user operating the user device. In many embodiments, the webpage can be similar or identical to webpage 500 (FIG. 5) and/or webpage 600 (FIG. 6). After receiving the request, the web server 320 can coordinate the display of the webpage. For example, web server 320 can send information to the user device, such as user computer 340-341 (FIG. 3) to display the webpage. In many embodiments, the webpage can include the featured filters from the second set of filters only when the mutual-information score calculated in block 413 exceeds the predetermined mutual-information threshold. The predetermined mutual-information threshold can be the parameter described above in connection with block 413. In many embodiments, determining the featured filters to display and determining whether to display the featured filters in response to the search query or category browse activity can be predetermined, such as in featured filter generation system 310.

As shown in FIG. 5, webpage 500 can include set of featured filters 520, which includes featured filters 521-525. Featured filters 521-525 shown in webpage 500 are each category filters for the following categories of vacuum cleaners: bagless uprights, bagged uprights, pet vacuums, canister vacuums, and stick vacuums. When selected, featured filters 521-525 each can apply its respective category filtering to further filter the "vacuum cleaner" search query results listed in item results listing 550.

As shown in FIG. 6, webpage 600 can include set of featured filters 620, which includes featured filters 621-625. Featured filters 621-624 shown in webpage 600 are each category filters for the following categories of twin mattresses: memory foam, bunk bed, innerspring mattresses, and pillow tops. When selected, featured filters 621-624 each can apply its respective category filtering to further filter the "twin mattress" search query results listed in item results listing 650. Set of featured filters 620 also include featured filter 625, which is a facet filter. Specifically, featured filter 625 is a facet filter for the facet of customer rating with a facet value of a top rating (e.g., a 5 rating on a scale of 1-5). When selected, featured filter 625 can apply its facet filtering to further filter the "twin mattress" search query results listed in item results listing 650. As shown in webpage 600, the set of featured filters (e.g., 620) can include featured filters of different types in the same set of featured filters (e.g., 620).

Figure 7:
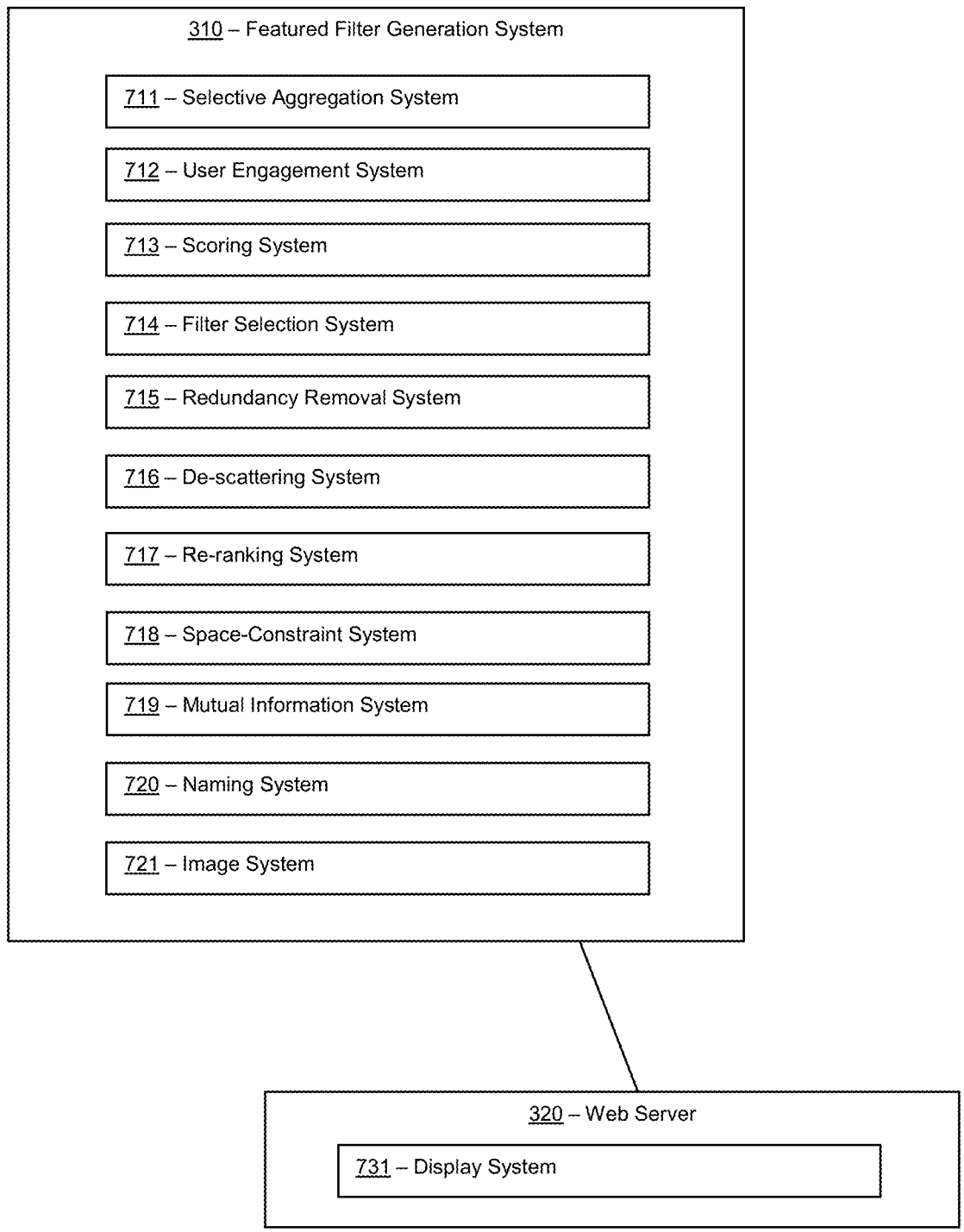
FIG. 7 illustrates a block diagram of the system of FIG. 3.

Turning ahead in the drawings, FIG. 7 illustrates a block diagram of system 300, according to the embodiment shown in FIG. 3. Featured filter generation system 310 and web server 320 are merely exemplary and are not limited to the embodiments presented herein. Featured filter generation system 310 and web server 320 can be employed in many different embodiments or examples not specifically depicted or described herein. In some embodiments, certain elements or system of featured filter generation system 310 and/or web server 320 can perform various procedures, processes, and/or acts. In other embodiments, the procedures, processes, and/or acts can be performed by other suitable elements or systems. In many embodiments, the system of featured filter generation system 310 and/or web server 320 can be modules of computing instructions (e.g., software modules) stored at non-transitory computer readable media. In other embodiments, the systems of featured filter generation system 310 and/or web server 320 can be implemented in hardware.

In many embodiments, featured filter generation system 310 can include an aggregation system 711. In certain embodiments, aggregation system 711 can at least partially perform block 401 (FIG. 4) of selectively aggregating a first set of filters for an item results list.

In a number of embodiments, featured filter generation system 310 can include a user engagement system 712. In certain embodiments, user engagement system 712 can at least partially perform block 403 (FIG. 4) of determining user engagement statistics for the item when the filter has been applied, which can be performed for each filter in the first set of filters and each item in the item results list.

In many of embodiments, featured filter generation system 310 can include a scoring system 713. In certain embodiments, scoring system 713 can at least partially perform block 404 (FIG. 4) of generating a filter score for each filter in the first set of filters; block 405 (FIG. 4) of generating an item-filter score for each item in the item results list for the filter; and/or block 406 (FIG. 4) of aggregating the item-filter scores across all items in the item result list for the filter.

In a number of embodiments, featured filter generation system 310 can include a filter selection system 714. In certain embodiments, filter selection system 714 can at least partially perform block 407 (FIG. 4) of selecting a second set of filters from the first set of filters based on filter scores of the filters in the second set of filters being above a threshold filter score.

In many of embodiments, featured filter generation system 310 can include a redundancy removal system 715. In certain embodiments, redundancy removal system 715 can at least partially perform block 408 (FIG. 4) of applying redundancy rules to remove redundant filters from the second set of filters.

In a number of embodiments, featured filter generation system 310 can include a de-scattering system 716. In certain embodiments, de-scattering system 716 can at least partially perform block 409 (FIG. 4) of applying de-scattering rules to group the filters in the second set of filters.

In many of embodiments, featured filter generation system 310 can include a re-ranking system 717. In certain embodiments, re-ranking system 717 can at least partially perform block 410 (FIG. 4) of applying re-ranking rules to reorder the filters in the second set of filters.

In a number of embodiments, featured filter generation system 310 can include a space-constraint system 718. In certain embodiments, space-constraint system 718 can at least partially perform block 411 (FIG. 4) of applying space-constraint rules to the second set of filters to limit a quantity of filters in the second set of filters based on a ranking of the filters in the second set of filters and based on a screen size of a user device.

In many of embodiments, featured filter generation system 310 can include a mutual information system 719. In certain embodiments, mutual information system 719 can at least partially perform block 413 (FIG. 4) of applying mutual-information rules to determine whether a mutual-information score for the second set of filters exceeds a predetermined mutual-information threshold.

In a number of embodiments, featured filter generation system 310 can include a naming system 720. In certain embodiments, naming system 720 can at least partially perform block 402 (FIG. 4) of applying name-generation rules to generate a display name for each filter in the first set of filters based on a type of the filter.

In many of embodiments, featured filter generation system 310 can include an image system 721. In certain embodiments, image system 721 can at least partially perform block 412 (FIG. 4) of applying image-selection rules to select a display image for each filter in the second set of filters.

In a number of embodiments, web server 320 can include a display system 731. In certain embodiments, display system 731 can at least partially perform block 414 (FIG. 4) of, after receiving a request to display a webpage that lists at least a portion of the item results list, coordinating a display of the webpage.

In many embodiments, systems and methods for automatic generation of featured filters described herein can provide several advantages over conventional system s and methods. For example, merchant modules or n-ups often are used in e-commerce search result web pages, and typically appear above the search results, and contain several filters (hence the name n-ups), which can allow customers to further specify their intent. Due to the high visibility of the merchant modules, they can have significant impact on how users interact with search results. Curation of these modules, however, requires significant human effort and is not scalable considering millions of distinct search queries and category browsing actions that e-commerce engines serve every day. Moreover, seasonal effects and new products added daily exacerbate the problem. Due to the extensive amount of work required, it is not possible to create these modules at scale, and maintain them to customize (e.g., optimize) for customer experience, conversion and discoverability at the same time. In some search engines, curated merchant modules are shown in approximately 15-25% of webpages listing search query results, but most of the search queries and/or category browsing actions do not have merchant modules displayed.

In many embodiments, the systems and methods for automatic generation of featured filters described herein can advantageously generate featured filters at scale, for search queries and category browse actions (e.g., browse shelves), and update them periodically (e.g., daily, weekly, monthly, etc.) based on user engagement. In several embodiments, the systems and methods for automatic generation of featured filters can beneficially increase the frequency at which featured filters are shown in webpages responding to search queries and category browse actions. In many embodiments, the systems and methods for automatic generation of featured filters can advantageously maintain featured filters based on recent user engagement data on a regular basis. In several embodiments, the systems and methods for automatic generation of featured filters can beneficially be more accurate of providing useful featured filters to help users find relevant items by being based on actual user engagement statistics that are aggregated and by apply mutual-information rules to facilitate that the featured filters will be helpful at providing useful information without introducing unnecessary friction. In other words, the systems and method described herein can advantageously facilitate determining whether the search query and/or browse category page would benefit from showing featured filters. This data-driven approach is superior to human curation, which does not apply these user engagement statistics and/or mutual-information rules.

In many embodiments, for every search query and/or category browsing action, the systems and methods described herein can beneficially identify and rank relevant filters and score the filters based on popularity of the filter and the filter's effectiveness at enabling customers to engage with the items the user is looking for. This scoring approach can beneficially facilitate that the featured filters are highly engaged and confirm that relevant items will show up in the results after the filter is engaged.

In several embodiments, the systems and methods described herein can advantageously remove duplicate, redundant, and/or irrelevant filters algorithmically, and de-scattering can be applied to facilitate that different type of popular filters are not scattered in the results, without sacrificing popularity. In many embodiments, the systems and methods described herein can beneficially confirm that the filters are logically ordered, creates display names for these filters, identifies images for filters. These featured filters can be used to disambiguate the query, understand customer intent, educate the customer of popular choices, drive conversion (e.g., engagement with items), and drive discoverability (e.g., finding additional relevant items). In many embodiments, the systems and methods described herein can beneficially provide for featured filters of multiple different types.

Although automatic selection of featured filters has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the modules within featured filter generation system 310 and web server 320 in FIG. 7 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions configured to run on the one or more processors and perform:

selectively aggregating a first set of filters for an item results list, the first set of filters comprising multiple filter types, the multiple filter types of the first set of filters comprising category filters, facet filters, and price filters;

for each filter in the first set of filters and each item in the item results list, determining user engagement statistics for the item when the filter has been applied;

generating a filter score for each filter in the first set of filters;

selecting a second set of filters from the first set of filters based on the filter scores of the filters in the second set of filters being above a threshold filter score, wherein the threshold filter score is a predetermined percentage of a highest filter score from among the filter scores for the filters in the first set of filters;

applying redundancy rules to remove redundant filters from the second set of filters;

applying space-constraint rules to the second set of filters to limit a quantity of filters in the second set of filters based on a ranking of the filters in the second set of filters and based on a screen size of a user device;

applying image-selection rules to select a respective display image for each of the filters in the second set of filters;

applying mutual-information rules to determine whether a mutual-information score for the second set of filters exceeds a predetermined mutual-information threshold; and after receiving a request to display a webpage that lists at least a portion of the item results list, coordinating a display of the webpage, wherein the webpage comprises the respective display image for each of the filters in the second set of filters and a set of options to select any of the filters in the second set of filters when the mutual-information score for the second set of filters exceeds the predetermined mutual-information threshold.

2. The system of claim 1, wherein the computing instructions are further configured to perform:

after selecting the second set of filters and before applying the space-constraint rules, applying de-scattering rules to group the filters in the second set of filters.

3. The system of claim 1, wherein the computing instructions are further configured to perform:

after selecting the second set of filters and before applying the space-constraint rules, applying re-ranking rules to reorder the filters in the second set of filters.

4. The system of claim 1, wherein:

the item results list is a search-query item results list;

the first set of filters further comprise one or more query reformulations; and the request to display the webpage is a search query from a user operating the user device.

5. The system of claim 1, wherein:

the item results list is a category-browsing item results list; and the request to display the webpage is a category browse request from a user operating the user device.

6. The system of claim 1, wherein the computing instructions are further configured to perform:

applying name-generation rules to generate a display name for each filter in the first set of filters based on a type of the filter.

7. The system of claim 1, wherein:

the user engagement statistics comprise item impressions when the filter is applied, item clicks when the filter is applied, item add-to-carts when the filter is applied, and item orders when the filter is applied.

8. The system of claim 1, wherein:

the user engagement statistics are based on a previous at least 90 days of historical user logs.

9. The system of claim 1, wherein:

generating the filter score for each filter in the first set of filters comprises:

generating an item-filter score for each item in the item results list for the filter; and aggregating the item-filter scores across all items in the item result list for the filter.

10. A method being implemented by one or more processors the method comprising:

selectively aggregating a first set of filters for an item results list, the first set of filters comprising multiple filter types, the multiple filter types of the first set of filters comprising category filters, facet filters, and price filters, each filter of the first set of filters having been applied to the item results list;

for each filter in the first set of filters and each item in the item results list, determining user engagement statistics for the item when the filter has been applied;

generating a filter score for each filter in the first set of filters;

selecting a second set of filters from the first set of filters based on the filter scores of the filters in the second set of filters being above a threshold filter score, wherein the threshold filter score is a predetermined percentage of a highest filter score from among the filter scores for the filters in the first set of filters;

applying redundancy rules to remove redundant filters from the second set of filters;

applying space-constraint rules to the second set of filters to limit a quantity of filters in the second set of filters based on a ranking of the filters in the second set of filters and based on a screen size of a user device;

applying image-selection rules to select a respective display image for each of the filters in the second set of filters;

applying mutual-information rules to determine whether a mutual-information score for the second set of filters exceeds a predetermined mutual-information threshold;

determining that the mutual-information score exceeds the predetermined mutual-information threshold; and after receiving a request to display a webpage that lists at least a portion of the item results list and based on determining that the mutual-information score exceeds the predetermined mutual-information threshold, coordinating a display of the webpage, wherein the webpage comprises the respective display image for each of the filters in the second set of filters and a set of options to select any of the filters in the second set of filters.

11. The method of claim 10 further comprising:

after selecting the second set of filters and before applying the space-constraint rules:

applying de-scattering rules to group the filters in the second set of filters.

12. The method of claim 10, wherein:

the item results list is a search-query item results list;

the first set of filters further comprise one or more query reformulations; and the request to display the webpage is a search query from a user operating the user device.

13. The method of claim 10, wherein:

the item results list is a category-browsing item results list; and the request to display the webpage is a category browse request from a user operating the user device.

14. The method of claim 10, further comprising:

applying name-generation rules to generate a display name for each filter in the first set of filters based on a type of the filter.

15. The method of claim 10, wherein:

the user engagement statistics comprise item impressions when the filter is applied, item clicks when the filter is applied, item add-to-carts when the filter is applied, and item orders when the filter is applied.

16. The method of claim 10, wherein:

generating the filter score for each filter in the first set of filters comprises:

generating an item-filter score for each item in the item results list for the filter; and aggregating the item-filter scores across all items in the item result list for the filter.

17. The method of claim 10, wherein:

after selecting the second set of filters and before applying the space-constraint rules:

applying re-ranking rules to reorder the filters in the second set of filters.

18. The method of claim 10, wherein:
the user engagement statistics are based on a previous at least 90 days of historical user logs.

* * * * *